June 17, 1924.
H. JONESON
1,497,855
ROCK RAKE
Filed Sept. 13, 1922  2 Sheets-Sheet 1
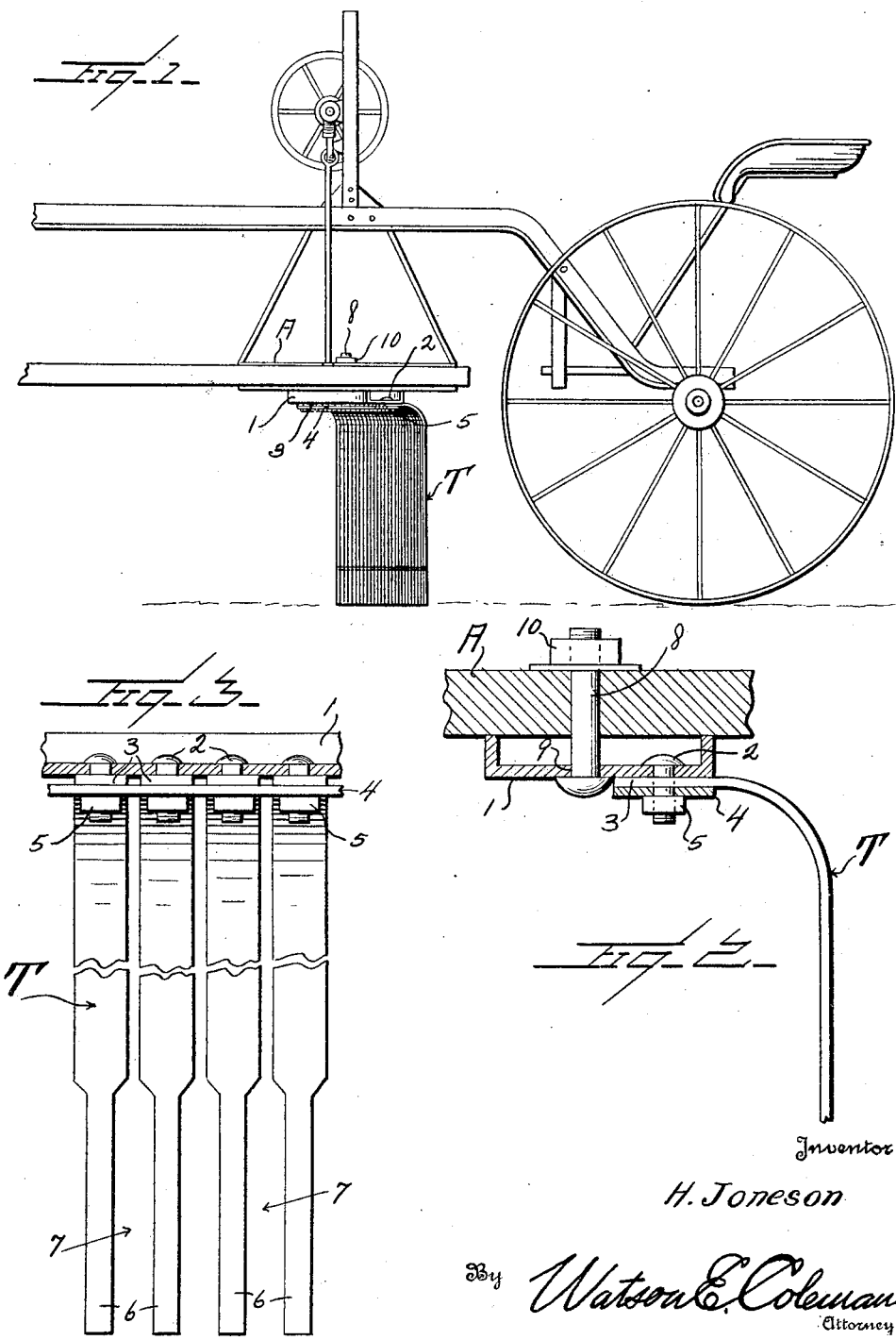
Inventor
H. Joneson
By Watson E. Coleman
Attorney June 17, 1924.  
H. JONESON  
ROCK RAKE  
Filed Sept. 13, 1922  
1,497,855  
2 Sheets-Sheet 2
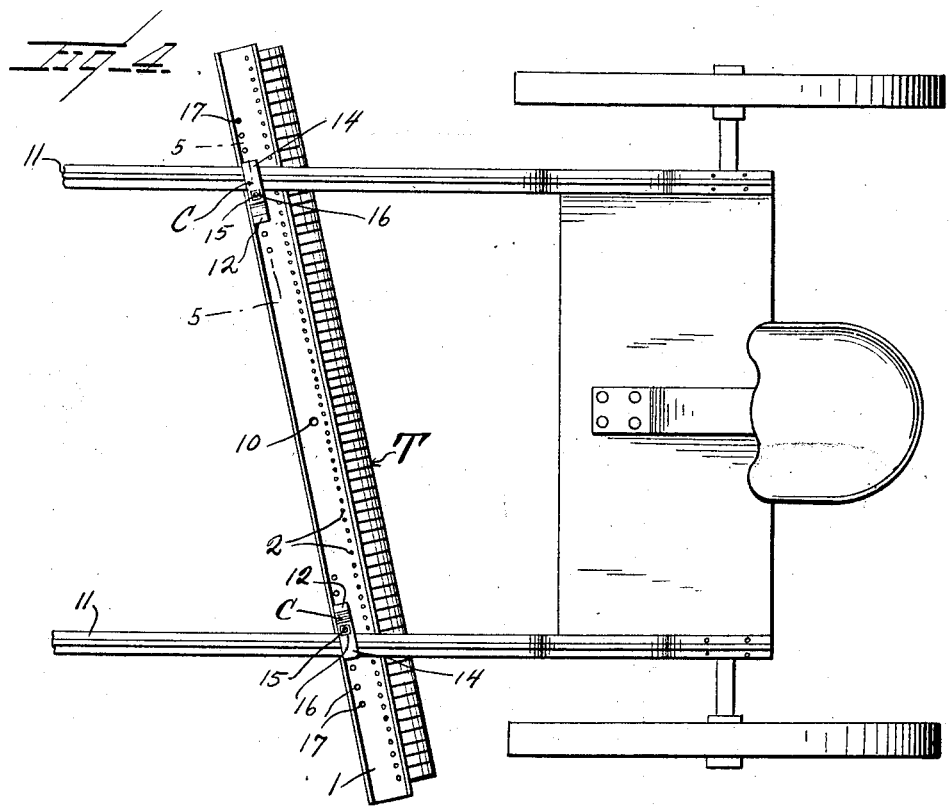
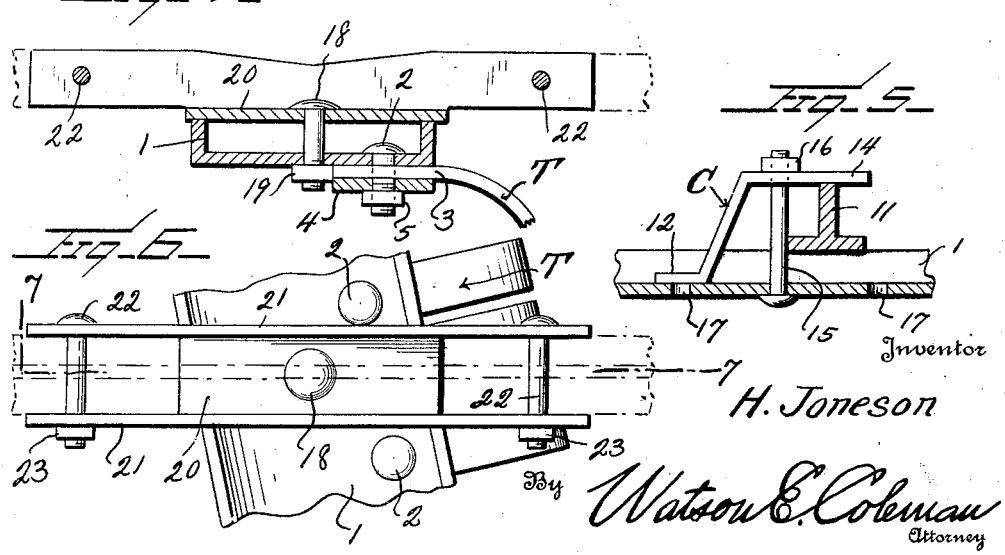
Inventor  
H. Joneson  
By Watson E. Coleman  
Attorney Patented June 17, 1924.

1,497,855

UNITED STATES PATENT OFFICE.

HERMAN JONESON, OF CORSON, SOUTH DAKOTA.

ROCK RAKE.

Application filed September 13, 1922. Serial No. 588,029.

*To all whom it may concern:*

Be it known that HERMAN JONESON, a citizen of the United States, residing at Corson, in the county of Minnehaha and State of South Dakota, has invented certain new and useful Improvements in Rock Rakes, of which the following is a specification, reference being had to the accompanying drawings.

This invention relates to certain improvements in rock rakes and has relation more particularly to a device of this general character especially designed and adapted for use in connection with a road grader, to facilitate the removing of oversized rock and gravel and thereby obviating the well known practice of using hand rakes for the same purpose and it is an object of the invention to provide a novel and improved device of this general character embodying means whereby the same may be effectively mounted in applied or working position.

It is also an object of the invention to provide a novel and improved device of this general character comprising a bar having secured thereto a plurality of tines or teeth, the working end portions of said tines or teeth being substantially perpendicularly disposed when the device is in applied position, the working end portions of the tines or teeth being also of a width less than the upper portion thereof whereby spaces of increased width are provided between adjacent teeth or tines.

The invention consists in the details of construction and in the combination and arrangement of the several parts of my improved rake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a view in side elevation demonstrating a rock rake constructed in accordance with an embodiment of my invention and operatively engaged with a turn table of a conventional type and which turn table generally has applied thereto a grading implement;

Figure 2 is an enlarged fragmentary view partly in cross section and partly in elevation illustrating means for attaching the rake to the turn table;

Figure 3 is a fragmentary view partly in elevation and partly in longitudinal section illustrating certain details of construction of the rake;

Figure 4 is a view in top plan illustrating a rake constructed in accordance with an embodiment of my invention engaged with the frame of a grader;

Figure 5 is a fragmentary sectional view taken substantially on the line 5—5 of Figure 4;

Figure 6 is a fragmentary view in top plan illustrating another means for attaching the rake to the side members of a grader frame or the like; and Figure 7 is a sectional view taken substantially on the line 7—7 of Figure 6.

As disclosed in the accompanying drawings, my improved grader comprises an elongated bar or beam 1 substantially U-shaped in cross section and which has secured to the under surface thereof through the instrumentality of the bolts 2 or the like the upper or horizontally disposed portions 3 of the teeth or tines T.

The teeth or tines T are made from spring steel of requisite thickness, preferably one-fourth of an inch or more, and relatively broad, approximately one and one-fourth inches in width. In practice, adjacent blades, at the bar or beam 1 are spaced apart about one-fourth of an inch, the bottom or under face of the member or beam 1 being preferably from four to six inches wide.

Underlying the portions 3 of the applied teeth or tines T is an elongated flat strip of metal such as iron or steel which serves to maintain the teeth or tines T in applied position and through which the bolts 2 are directed, the lower end portions of the bolts 2 having engaged therewith the clamping nuts 5 which have direct contact with the member or plate 4. As is clearly illustrated in the accompanying drawings, the working portions of the teeth or tines T are substantially perpendicularly disposed with respect to the surface with which they engage and the lower or working end portions of said teeth or tines are reduced from opposite sides in width as indicated at 6, such reduction affording between the working end portions of the teeth or tines the enlarged spaces 7, which in practice approximates seven-eighths of an inch.

When my improved rake is in applied position it is diagonally disposed with respect to the direction of travel with respect to the grading machine or the like to which it is applied so that as the rake traverses over the roadway it will collect stones or the like of a diameter larger than the space 7 between the teeth or tines T and deliver such collected stones or the like to one side and thus free the roadway of such stones or the like as would otherwise interfere with travel by auto or other vehicles.

In the embodiment of my invention as particularly illustrated in Figures 1 and 2, the rake is employed in connection with a turn table A of a conventional type and with which a grading implement is ordinarily employed. A bolt 8 is preferably disposed upwardly through the central portion of the member or beam 1 and through the opening 9 provided therefor. This bolt 8 is also directed through the turn table A and has engaged with its upper end portion a clamping nut 10 or the like.

As illustrated in Figures 4 and 5, the rake is operatively engaged with the side members 11 of the grading machine. As illustrated in said figures, such mounting is accomplished by the clips C. Each of the clips is provided with a foot 12 which rests upon the member or beam 1 and has its opposite end portion comprising an arm or extension 14 which overlies and contacts from above with the adjacent side member 11. Disposed upwardly through the member or beam 1 is a bolt 15 which also extends upwardly through the extension or arm 14. Engaged with the bolt 15 is a clamping nut 16 which engages the extension or arm 14 from above whereby the member or beam 1 is effectively held to the side member 11. When the clips C are employed it is to be understood that the beam or member 1 underlies the side members 11 of a grading machine and has contact therewith as is believed to be clearly illustrated in Figures 4 and 5 of the accompanying drawings.

While I have hereinbefore specifically stated that the clips C may be employed to secure the rake to the side members of the frame of the grading machine it is to be understood that they may be employed with equal facility to attach the rake to the angle iron of the fifth wheel as is ordinarily employed or otherwise as the requirements of practice may prefer.

Each of the bolts 15 is adapted to be selectively inserted upwardly through one of a series of openings 17 provided in the member or beam 1 and extending lengthwise thereof. This is to compensate for different spacing between the members 11 or other elements or members with which the clip C may be engaged.

In the embodiment of my invention as illustrated in Figures 6 and 7 each end portion of the beam or member 1 has resting thereon, and clamped thereto by the coacting bolt 18 and nut 19, a relatively narrow plate 20 having its side or longitudinal margins defined by the upstanding flanges 21, said flanges being of a length to extend a predetermined distance beyond the opposite ends of the plate 20. A side member of the frame of a grading machine or other element is received between the flanges 21 and secured thereto by the transversely disposed or directed bolt 22 with which are associated the clamping nuts 23.

From the foregoing description it is thought to be obvious that a rake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:

A rock rake comprising a bar substantially U-shaped in cross section, spring teeth having end portions extending rearwardly from and underlying the bar, a plate underlying the bar and the adjacent end portions of the teeth, a member common to each tooth, bar and plate for holding the same in assembled relation, the working end portions of the teeth being substantially perpendicularly related to the bar.

In testimony whereof I hereunto affix my signature.

HERMAN JONESON.